United States Patent
Shtivelman

(10) Patent No.: US 6,788,781 B2
(45) Date of Patent: *Sep. 7, 2004

(54) EMERGENCY CALL LOAD MANAGEMENT FOR CALL CENTERS

(75) Inventor: Yuri Shtivelman, Belmont, CA (US)

(73) Assignee: Genesys Telecommunications Laboratories, Inc., Daly City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/438,675

(22) Filed: Nov. 12, 1999

(65) Prior Publication Data

US 2002/0054670 A1 May 9, 2002

Related U.S. Application Data

(62) Division of application No. 09/128,276, filed on Aug. 3, 1998, now Pat. No. 6,118,866.

(51) Int. Cl.[7] .............................................. H04M 3/42
(52) U.S. Cl. .............. 379/309; 379/211.01; 379/266.04
(58) Field of Search .................... 379/88.13, 88.16, 379/88.17, 88.22–88.25, 67.1, 210.01–210.03, 211.01, 211.02, 213.01, 214.01, 265.01–266.1, 308, 309, 112.01–112.1, 917; 370/352–357

(56) References Cited

U.S. PATENT DOCUMENTS

| | | | | | |
|---|---|---|---|---|---|
| 4,800,583 A | * | 1/1989 | Theis | .................... | 379/142.01 |
| 5,384,841 A | * | 1/1995 | Adams et al. | ......... | 379/207.15 |
| 5,537,470 A | * | 7/1996 | Lee | ........................ | 379/142.06 |
| 5,657,383 A | * | 8/1997 | Gerber et al. | .......... | 379/210.01 |
| 5,923,745 A | * | 7/1999 | Hurd | .................... | 379/265.02 |
| 5,946,387 A | * | 8/1999 | Miloslavsky | ........... | 379/220.01 |
| 5,946,388 A | * | 8/1999 | Walker et al. | ......... | 379/265.02 |
| 6,118,866 A | * | 9/2000 | Shtivelman | ............ | 379/210.02 |
| 6,175,621 B1 | * | 1/2001 | Begeja | .................. | 379/208.01 |
| 6,301,354 B1 | * | 10/2001 | Walker et al. | ......... | 379/221.01 |

* cited by examiner

*Primary Examiner*—Roland G. Foster
(74) *Attorney, Agent, or Firm*—Donald R. Boys; Central Coast Patent Agency, Inc.

(57) ABSTRACT

An emergency call load handling system in a call network has an interactive voice response (IVR) unit associated with a switching apparatus to which calls may be diverted in special conditions, such as during emergencies or disasters when calls to certain destinations may suddenly increase dramatically. Calls are diverted depending on call destination and/or pre-programmed triggers, such as a call load threshold experienced by the switching apparatus or for a specific destination. The IVR unit in some cases negotiates with callers for priority to further route calls, and may play pre-recorded messages. Low priority calls are typically disposed of to for fire stations, hospitals, government emergency handling centers and the like. In some cases rules may be amended in real time by use of data network connections between call centers and the SCPs involved.

14 Claims, 3 Drawing Sheets

EMERGENCY CALL LOAD MANAGEMENT FOR CALL CENTERS

CROSS-REFERENCE TO RELATED DOCUMENTS

The present application is a Divisional application of application Ser. No. 09/128,276, filed Aug. 3, 1998, bearing the same title, which has issued as U.S. Pat. No. 6,118,866.

FIELD OF THE INVENTION

The present invention is in the field of telecommunications and has particular application to methods and apparatus for managing call loading to call centers under disaster or other emergency conditions.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventors and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving customers of large insurance companies and the like.

Still more call centers are of the form of public-service centers such as emergency service-centers, rescue centers, large hospitals, public utilities, weather-alert centers, police and fire centers, and so on. It is to these types of call centers that the method and apparatus of the present invention will apply more particularly, although they may also be applied to any CTI call-center.

In a public-service call center, such as at a large hospital or a police department, a relatively large number of service operators may handle telephone communication with callers. Each service operator is typically assigned to a telephone connected to a central switch on the premises, which is in turn connected by one or more trunk lines to a public-switched telephone network (PSTN), as is well-known in the art. The central switch may be one of several types, such as Automatic Call Distributor (ACD), Private Branch Exchange (PBX), and so on.

An organization having one or more call centers for serving the public typically provides one or more telephone numbers to the public that may be used to reach the service. The number or numbers may be published in a telephone book, broadcast on television or radio, or the like. There are basically two situations. If the organization providing the service has a single call center, the number will be to the call center, and all further routing to a service operator will be at the call center. If there are several call centers, the organization may provide several numbers, one for each call center, and the customer may be expected to use the number for the closest center, or for the center advertised to provide specifically the service he or she might need. In other cases there may be a no-charge-to-calling-party number (800, 888) which will connect the caller with a first Service Control Point (SCP) which is adapted request a call routing and to route call to call centers or other destinations.

Routing of calls, then, may be on several levels. Pre-routing may be done at SCPs and further routing may be, and often is accomplished at individual call centers. As described above a call center typically involves a call-switching apparatus, which may also be computer enhanced (CTI) for providing additional functionality.

In a CTI system telephone stations connected to the central switch may be equipped also with computer terminals, so service operators manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center. It is this processor that provides the CTI enhancement for the call center.

When a call arrives at a call center, whether or not the call has been pre-processed by a SCP, typically at least the telephone number of the calling line is made available to the receiving switch at the call center by a telephone carrier. This service is available by most PSTNs as Destination Number Information Service (DNIS) or Automatic Number Identification (ANI) data. If the call center is computer-enhanced (CTI) the phone number of the calling party may be used to access additional information from a database at a server on the network that connects the service operators workstations. In this manner information pertinent to a call may be provided to a service operator.

Referring now to an example of a large emergency-service center such as a disaster-relief center, service operators working in such a center will typically handle a large volume of calls during an emergency period from people seeking information on relatives, instructions for evacuation, locations for emergency supplies, places and times for applying for further relief, and so on. Typically, the calls are handled by a finite number of trained service operators, which may be distributed over a decentralized matrix of call centers, or at a single call center. In examples used herein illustrating various aspects of the present invention, the case of a decentralized system of multiple call centers will often be used, although, in various embodiments, the invention will also be applicable to individual call centers. Further the invention will be applicable to the generalized situation of overload between any two switching points in a network.

Even with present levels of CTI there are still problems in operating public-service call-centers, or a system of such call centers, especially in times of emergency. There are waiting queues with which to contend, for example, and long waits may be experienced by some callers during emergency periods wherein call volume is unusually high. Other difficulties accrue, for example, when there are hardware or software degradations, failures, or overloads in one or more parts of a system, perhaps due to natural disaster. Another problem presents itself when authorized personnel such as rescue workers, police officials, fire officials, and the like attempt to connect to needed services only to find the centers overloaded with callers having needs of lesser importance. Still other problems accrue due to known latency in conventional equipment contributing to a high call-volume overload during emergency periods. There are many other problems, and it is well recognized in the art, and by the general public who have accessed such call centers, that there is much room for improvement in the entire concept and operation of emergency call-center systems.

What is clearly needed is a method and apparatus allowing call volume at any switching apparatus or switching or routing center in a network to be managed by diverting calls to an IVR or other service wherein calls may be prioritized and routed by priority. Such a system would be particularly applicable to emergency related service-centers and other related service centers to manage the large volume of incoming calls to their call centers during an emergency period wherein important calls from the public and other authorized personnel may be prioritized, preferably in the network. A system such as this would insure that high priority calls are not delayed because of call overload.

SUMMARY OF THE INVENTION

In a preferred embodiment of the present invention a network-level call load-handling system, comprising a switching apparatus in the network adapted for routing incoming calls; and an interactive voice-response (IVR) selective routing unit connected to the switching apparatus, and adapted for processing selected calls. Selected calls are diverted to the IVR unit for negotiation with the calling party, and diverted calls are forwarded, blocked, delayed, or otherwise selectively processed by specific programmed rules.

In some cases calls are diverted to the IVR for selective processing based upon a call-load threshold applied to load experienced by the switching apparatus. Selective processing may comprise playing one or more pre-recorded messages to the calling party. Also in some embodiments the calling parties on diverted calls are prompted to enter a code, and upon entry of the code the call is processed according to programmed rules associated with the code.

In a preferred embodiment the IVR is programmed to handle incoming calls for one or more subscribing call centers, and calls are diverted to the IVR unit based on pre-programmed call-loading levels for each call center. The embodiments of the invention are not limited to conventional dedicated-connection call networks, but may also be applied to such as data-network telephony networks, which are typical packet networks. Such a DNT-capable network may be the Internet. Also, ion some cases the switching apparatus comprises a plurality of telephony switches or routers, and wherein one IVR serves the plurality of switches or routers.

In another aspect of the invention a call load-handling system is provided, comprising a switching apparatus in a network adapted for receiving and routing incoming calls; an interactive voice-response (IVR) selective routing unit connected to the switching apparatus; and one or more call centers connected by one or more telephony trunks to the switching apparatus. Selected calls destined for the one or more call centers are diverted to the IVR unit for negotiation with the calling party, and diverted calls are forwarded, blocked, delayed, or otherwise selectively processed by specific programmed rules. In some embodiments calls are diverted to the IVR for selective processing based upon call load characteristics experienced by the switching apparatus for calls destined to one or more of the call centers. Different call load thresholds are stored and applied for different call centers. In some instances selective processing comprises playing a pre-recorded message to the calling party. Also in some embodiments callers are prompted to enter a code, and upon entry of the code the call is forwarded to the original destination.

In still another aspect of the invention a method for handling call loading at a network switching apparatus is provided, comprising steps of (a) programming diversion criteria in an alternative interactive voice response (IVR) processor also adapted to route calls; (b) screening calls for diversion criteria, and diverting calls to the IVR when the criteria are met; and (c) processing the diverted calls according to pre-programmed rules. In this embodiment, in step (a) the diversion criteria may include call-loading experienced by the switching apparatus or by a connected call center. In step (c) the rules may include entry of special codes by a caller to establish priority for processing.

In various embodiments of the invention taught below in enabling detail, methods and systems are provided for the first time to automatically handle and alleviate call overloading for any reason in all types of telephony networks.

BRIEF DESCRIPTION OF THE DRAWING FIGURES

DESCRIPTION OF THE PREFERRED EMBODIMENTS

Figure 1:
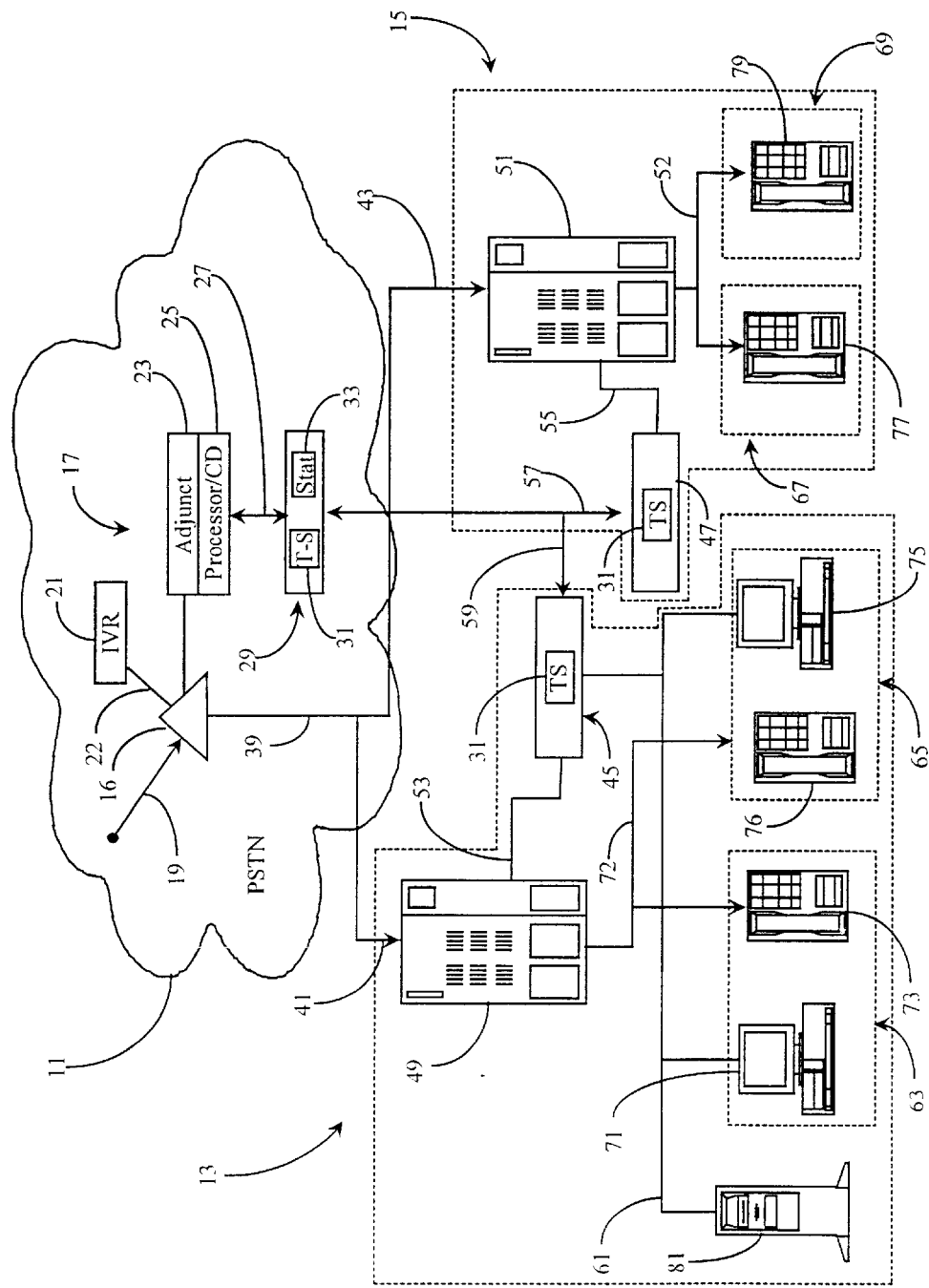
FIG. 1 is an overview of a system with call-load management capability according to an embodiment of the present invention.

FIG. 1 is an overview of a system with call-load management capability according to a relatively narrow embodiment of the present invention. In this example, there are two call-centers illustrated, call center 13 and call center 15. Both call centers 13 and 15 are connected to a PSTN network 11 via telephony trunks 41, and 43 respectively. Call-centers 13 and 15, in this particular embodiment, are emergency service-centers as described in the background section, but may in practice be any type of call center to which a heavy load of calls may be directed for any reason.

Network 11 will typically be a public telephone network as shown, but may also be another type of network as known in the art such as a private telephone network or a data network telephony network like the Internet. In this example a service control point (SCP) 17 is provided within cloud 11 as a reference for routing incoming calls to a switching apparatus 16, calls represented vector 19. Calls 19 may originate from anywhere in cloud 11. SCP 17 includes processors that may be CTI enhanced in this embodiment by connected CTI equipment described in more detail below.

Call center 13 comprises a central switch 49, a CTI processor 45, a local area network (LAN) 61, service-operator stations 63, and 65, and a LAN connected database 81. This simple representation of call center 13, is deemed sufficient by the inventor for the purpose of illustrating the method and apparatus of the present invention, although an actual call center of the type described herein may comprise many more operator stations and related equipment.

Switch 49 is connected via CTI link 53 to CTI processor 45. CTI processor 45 is further connected to LAN 61. It is processor 45 that provides CTI enhancement to call center 13. Also connected to LAN 61 are operator stations 63 and 65. There are personal computers with video display units (PC/VDUs) 71 and 75 at station 63 and 65. Each station is also equipped with a switch-connected telephone connected to switch 49. These are telephone 73 implemented at station 63, and telephone 76 implemented at station 65. Telephones 73 and 76 are connected to central switch 49 via phone wiring 72. Database 81 is a source of information shared by service operators over LAN 61. Database 81 contains pertinent information needed by service operators to assist them in processing calls. LAN 61 may be another type of shared network as is known in the art.

Call center 15 comprises a central switch 51, a CTI processor 47, two service-operator stations 67 and 69, with stations 67 and 69 having switch-connected telephones 77 and 79 respectively. Telephones 77 and 79 are connected to switch 51 via telephone wiring 52. Processor 47 is connected to switch 51 via CTI link 55. PC/VDU's, a database, and a LAN to connect them are not shown within call center 15, but may be assumed to be present.

As previously described, it is processors 45 and 47 that provide CTI enhancement to call centers 13 and 15 respectively. Similarly, SCP 17 is CTI-enhanced primarily via a processor 29 and secondarily via processors 23 and 25. A separate digital data-network provides a link between various processors such as processors 45 and 47 within call centers 13 and 15, and processor 29 in cloud 11. This digital data-network comprises a two way data connection 57 and a similar two way data connection 59. With respect to this example, the convergence of data links 59 and 57 into cloud 11 and the diverging thereof into each call center simply represents one variety of many connection architectures that may be employed.

Additional processors, adjunct processor 23, and a call-distribution processor 25, provide additional function to SCP 17. For example, adjunct processor 23 is linked directly to switching apparatus 16 and provides basic functionality to SCP 17. Call-distribution processor 25 has call statistics describing call distribution between call-in centers 13 and 15 (typically over a larger number of call-in centers than two). An intelligent peripheral in the form of an interactive voice response unit (IVR) 21 is linked to switching apparatus 16 via a link 22. The IVR may, in some embodiments, be elsewhere than in the network cloud, and may be connected and accessed in a variety of ways. For the purposes and objects of the invention it is needed that calls by diverted to the IVR, and that the IVR be capable of negotiating with the caller. In one aspect calls may be converted to DNT calls and sent to the IVR by a packet network, such as the Internet.

It will be apparent to one with skill in the art that CTI equipment as described herein may be implemented in many different ways such as providing one multi-capable processor or separate, linked processors, as shown in this embodiment. It will also be apparent to one with skill in the art that there may be many more call centers, SCP's and CTI processors than are shown in this embodiment. The inventor intends only to illustrate general connectivity of such equipment for the purpose of explaining aspects of present invention.

Processor 29 in network 11 is running an instance of a T-server which a CTI application 31. An instance of T-server 31 is also running on processor 45 in call center 13, and on processor 47 in call center 15. T-server 31 controls how calls 19 are routed through the system according to programmable rules existing within each call center for the routing of calls within the call center, and according to rules established via each call center for routing their calls at the network level. For example, T-server 31 running on processor 29 may control how calls will be routed by SCP 17. T-server 31 running on both processors 45 and 47 control in-house routing, outbound routing, and may, in some instances, exert control over processor 29 through communication with T-server 31 running in processor 29.

It is important to note here that every call center practicing the present invention is not required to have a T-server application for enhanced routing. The fact that a T-server application is shown in each call center illustrated, and also at cloud 11 merely presents one possible arrangement wherein participating call centers may implement routing software of one provider or manufacture.

Intelligent routing applications, represented by T-server 31 in this embodiment, may differ in functionality and in scope from call center to call center as the entire invention may be practiced in the network. However, enhanced function may be achieved at the level of individual call centers wherein such call centers have intelligent routing capabilities through their software applications. The software of the present invention may be enabled to communicate with known routing applications normally used in call centers and at the network level. Furthermore, call centers practicing the present invention need not have identical architecture or equipment such as PC/VDU's, databases, or even a LAN connection.

In a preferred embodiment of the present invention, and as illustrated in this example, a unique method is provided as a subscriber service whereby all or a part of incoming calls 19 arriving at a switching apparatus 16 may be selectively rerouted to IVR 21 instead of being routed immediately to their original destinations such as call centers 13 and 15, or on to another switching apparatus in the network. This process of diverting incoming calls to IVR 21 is made unique by virtue of, for example, its programmable nature, and also by the function of monitoring call loading and initiating diversion based on load aspects. In some cases the process may be programmed for each participating call center, such as centers 13 and 15, while using the routing rules and known call capacities inherent to each individual call center. The process may also be programmed for just the particular switching apparatus without regard to a final destination such as a call center.

Times for implementation of such rerouting of calls 19 to IVR 21 will, in some embodiments, be during emergency situations wherein call loading for certain numbers will be drastically increased over normal call volume. Depending on the type and severity of a disaster or emergency, certain public-service agencies hosting call centers such as centers 13 and 15 may experience an overload of incoming calls over a period of time that is sufficient to paralyze or severely cripple the ability of that center or centers to respond in a timely fashion to those most in need. As previously described, an important object of the present invention is to provide a specific protection against such call-overload conditions.

The service of the present invention in one embodiment, termed emergency call-load management (ECLM) by the inventor, provides call centers with an ability to overcome disaster or emergency-related call congestion via intelligent routing at the network level wherein only acceptable call loads for each call center are allowed through. This innovative technique affords participating call centers protection against call-overload during emergencies. Call-load determination and implementation for a call center may be accomplished in a number of ways.

In a simple embodiment, a call threshold is established for a call center such as call center 15, or for a connecting trunk or the like. Pre-routing at the network level may automatically begin when that pre-set threshold is surpassed as indicated via one of several known call-monitoring techniques that may be implemented in the IVR or even in a call center or at the level of the network. In one case, T-server 31 running on CTI processor 51 monitors the level of incoming calls arriving at switch 51. When the level of incoming calls at the call center meets or exceeds the established threshold, T-server 31 running on processor 47 sends a command to T-server 31 running on CTI processor 29 in cloud 11. The command may be to begin diverting calls at a selected percentage of the total incoming calls destined to call center 15, putting call center 15 back under the acceptable call-load level. In other aspects, monitoring may be in the network at the switching apparatus associated with the IVR, and initiation of diversion may be by any of a variety of criteria, such as load level and so forth.

The mix of incoming calls 19 arriving at switching apparatus 16 will typically be destined to more than one call center. Identification of the destination of calls 19 may be made through one or more of a variety of well-known regimens such as destination number identification service (DNIS) provided by the telephone carrier. With regards to the simple embodiment described above, assume 25% of calls 19 that are destined for call center 15 are diverted to IVR 21. At IVR 21 callers may have the situation explained to them via voice recording and perhaps prompted with various choices depending on their interaction with IVR 21 which may include voice recognition technology, touch tone response, and so on. Some of the diverted calls may selectively be routed on to call center 15 if found to be important calls. The simple embodiment described above employs random selection of a percentage of callers for diversion to IVR 21.

In other embodiments, more sophisticated intelligent-routing methods may be employed. For example, call center 13 may be a rescue dispatch and emergency service coordination center. In this case, it becomes important to prioritize calls when the established call-threshold has been exceeded during an emergency.

Important callers such as calls from emergency workers and certain authorities may be given a password or code number. Whether out in the field or calling from other centers, these callers must be able to get through despite many lower-priority calls. Such a password or code would be solicited from callers during their interaction with IVR 21.

Additionally, an instance of statistical server 33 running on CTI processor 29 in cloud 11 may record the progress of the system in such areas as call-duration-delay statistics, percentage parameters regarding call mix (i.e. ratio of priority calls to routine calls), historical statistics regarding system performance during previous emergencies, etc. This information may then be reported to a service provider hosting the service and/or to individual call centers to aid in setting or changing their routing rules, threshold levels, and so on.

Any percentage or all of incoming calls 19 may be diverted from switching apparatus 16 to IVR 21 triggered by any appropriate criteria. In one case all calls 19 are rerouted to IVR 21 where the callers are prompted to enter a password or hold. Those callers having the correct code or password would be immediately routed. Callers not having authority via code or password may be prompted further as to the importance of their call, and routed accordingly. In this way, all important personnel working to alleviate the emergency situation at hand are not obstructed because of congested lines, and important work of handling the situation may continue unimpeded. Callers seeking information such as details or updates on the status of the emergency may, in some embodiments, be routed to those appropriate services at the network level. Also, for emergencies, canned messages, including emergency instructions, may be programmed at IVR 21 for announcement to callers. Such messages may also include wait times for those who wish to continue to try to place a call.

By enabling various call centers to share SCP and IVR function at the network level, costs for maintaining the service may be kept at a minimum while providing each center with a call-overload protection which, of itself, saves money for participating organizations hosting the affected service centers, and improves their response and performance.

The example provided by reference to FIG. 1 above is a detailed and somewhat narrow example of an application of the present invention. The invention is equally applicable in the case of Data Network Telephony (DNT) calls in a packet data network. The best example of such a network with telephony is the Internet wherein Internet Protocol Network Telephony calls are supported. Such a system may be generally described by further reference to FIG. 1.

In the DNT case the network 11 is a packet data network, such as the Internet, and the equipment shown in the network cloud is routing equipment as is generally known in the Internet and other wide area packet networks, plus computer enhancements known to the inventor. It is known to the inventor, for example, to enhance a router or other Internet connected server with a CTI processor executing CTI applications. In this manner SCP services and the like may be provided for DNT calls in a packet network. Further, CTI enhancement in such a network may also provide IVR services and be adapted to provide the overload services of the present invention. In this case, call volume may be monitored and calls diverted to the IVR in case of volume exceeding a threshold, with the IVR adapted to process calls as described for the PSTN example provided above.

Figure 2:
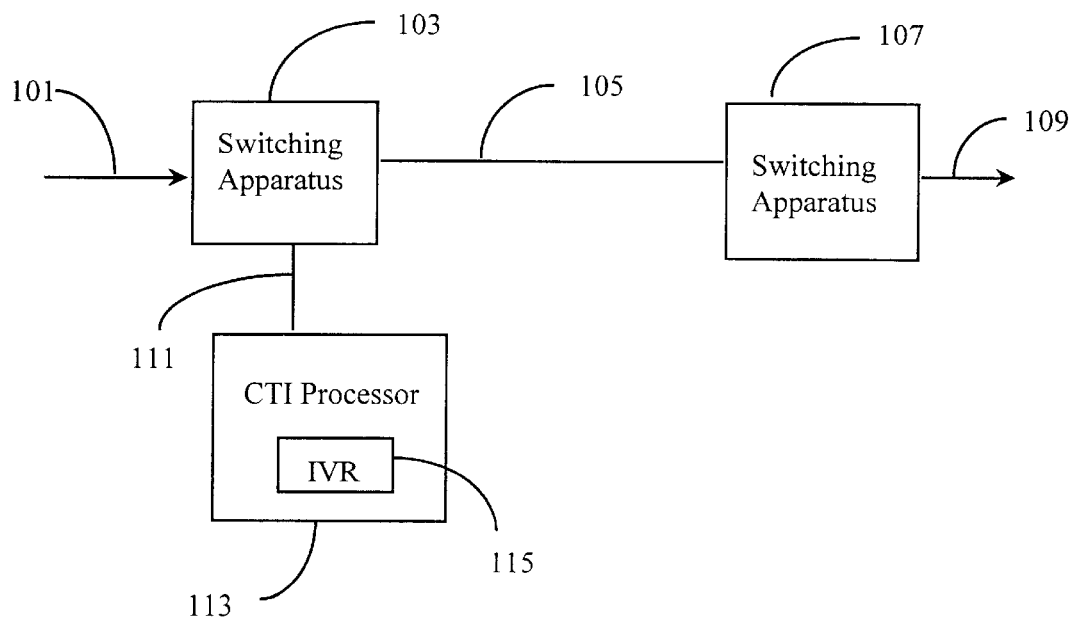
FIG. 2 is a generalized block diagram illustrating the present invention in broad aspects.

FIG. 2 is a block diagram of a generalized case broadly illustrating aspects of the present invention. In FIG. 2 a switching apparatus 103 is enhanced by a CTI processor 113 capable of executing CTI applications. Apparatus 103 may be any of an SCP, an Internet Protocol router, a class 5 PSTN switch or the like. In some cases, in known PSTN networks, there is a local group of switches, such as class 5 switches, serving a first locality, and the first group is connected by a trunk system to a second group of switches at a second locality, such as another city. One group, for example, may serve San Jose, Calif., and the second San Francisco, Calif. In such a situation block 103 represents the first group of switches, and block 107 the second.

Calls are received via at least one dedicated trunk (PSTN) or data link (DNT) 101, and routed by link 105 to another (downstream) destination 107, which may be another DNT router, a PSTN switch, etc, depending on the network type, or may be a final destination, such as a call center of telephone or computer platform.

Apparatus 103 is connected via link 111 to a CTI processor 113, adapted to execute CTI applications. IN this case the CTI processor provides an IVR and functionality according to one or more embodiments of the present invention. In general, call volume is monitored against a preset threshold, and calls are diverted to an IVR 115 in case the threshold is met or exceeded. The IVR may be implemented as a part of the CTI application set on the CTI processor, or may be a separate server accessible to processor 113. The IVR may have the functionality described for IVR 21 in FIG. 1, or may employ a subset of that functionality.

Figure 3:
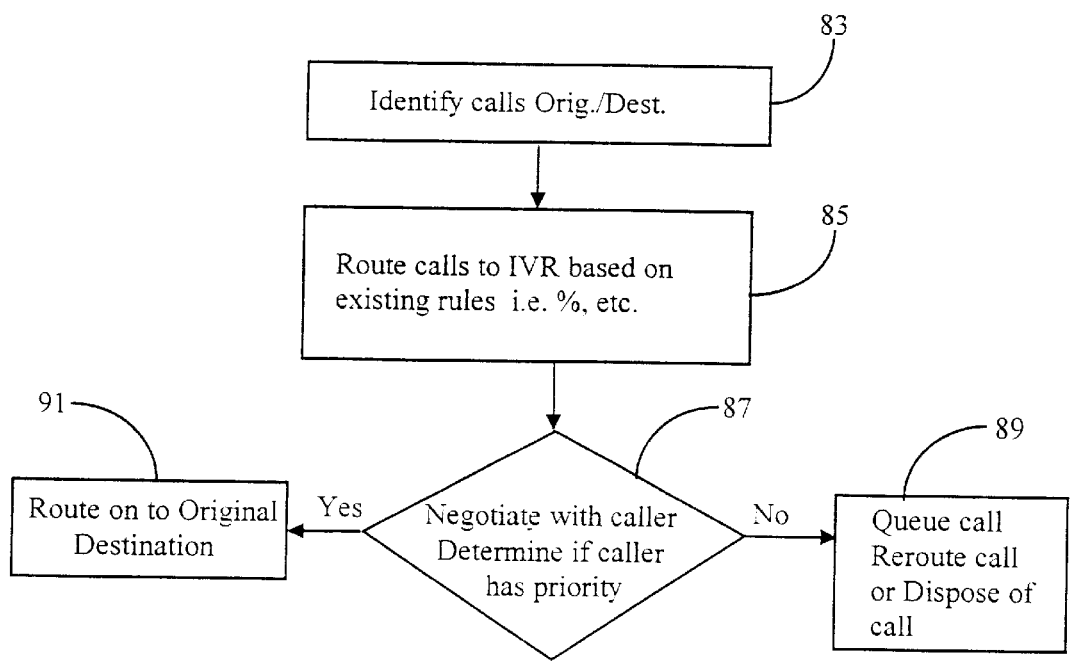
FIG. 3 is a flow diagram illustrating various steps of network-level routing provided by emergency Call Load Management (ECLM) according to an embodiment of the present invention.

FIG. 3 is a software flow-diagram illustrating various steps of network-level routing provided by ECLM according to an embodiment of the present invention. In this basic example, incoming calls arriving at SCP 17 of FIG. 1 are identified in step 83. Various methods may be used for this purpose. Well known examples are caller line identity CLID and DNIS methods typically provided by telephone carriers. As more than one call center will typically be serviced by one SCP such as SCP 17, destination numbers must be identified before proceeding. Also, there may be several SCPs involved along with a mix of call centers, and programming at different SCPs may be duplicated for certain centers.

After incoming calls are identified, they are selectively diverted in step 85 to IVR 21 of FIG. 1, based on existing rules which may vary according to particular situations. For example, a call center such as call center 13 of FIG. 1 may have all calls diverted to IVR 21 once a certain call-load capacity is reached, whereas call center 15 may only have a certain percentage of incoming calls diverted under the same circumstance. Another call center may accept all calls from a certain geographical location and none from another, and so on.

Additionally, call centers having sophisticated routing capability may, in some instances, manipulate network-level routing by virtue of their own software applications such as T-server 31 of FIG. 1. For example, call center 13 may modify it's own threshold rules for network-level routing from within. If a call center has more than one internal telephony switch, additional pre-routing instructions may be applied at the network level regarding routing to either switch for load-balancing reasons, and so on. Therefore, activation of the service need not be entirely automatic with regards to load capacities or other parameters monitored at call centers or in the network for that matter.

In some special instances wherein the service center is very large, perhaps having a plurality of different routing points to different facets of service, a service administrator may undertake the task of insuring that load capacities, and other parameters are duly monitored during the course of the emergency, making necessary changes when required. Exact parameters entered into the system will depend upon the nature of service or services offered by an affected call center, and on the functionality of that call center in terms of sophisticated routing capability.

Referring again to FIG. 3, step 87 covers negotiation with each diverted caller at IVR 21. For example, touch-tone response or, perhaps voice recognition is used to obtain additional information from the caller. Such information obtained helps to determine a priority for the call. A password or code could be pre-provided as previously described to certain authorized personnel known to perform important functions during emergency situations. These personnel may be police, firemen, rescue units, military personnel, physicians, and so on.

Other functions performed in step 85 may include, but are not limited to, providing recorded assistance to callers, ascertaining a specific purpose for a call, and so on. If it is determined that a diverted call should retain priority in step 87, then it is routed on to its original destination without further delay in step 91. If however, a call is determined to be routine or otherwise lower priority, then it may be queued, rerouted to another more appropriate service, or disposed of in step 89.

It will be apparent to those with skill in the art that the method and apparatus of the present invention may be implemented in various ways without departing from the spirit and scope of the present invention. For example, in one embodiment, ECLM is a subscriber service wherein participating centers provide their information to a service provider who subsequently activates their service, perhaps providing software enabling access to associated hardware at the network level, and so on.

In another embodiment, various emergency centers may be coordinated under the system wherein a local government provides the service which may be mandatory under certain emergency conditions such as hurricane, severe floods, civil unrest, and so on.

There may be several IVRs such as IVR 21 provided in network 11 as well as several SCPs such as SCP 17 and related equipment without departing from the spirit and scope of the present invention. A distributed architecture could be spread over a large region and service many call centers helping to enhance service to the public in the wake of a natural disaster or other emergency situation.

In a future embodiment, ECLM could be incorporated into a data-network-telephony (DNT) infrastructure wherein call centers having DNT capabilities, such as Internet Protocol Network Telephony (IPNT) service may limit their DNT call loads during an emergency. DNT technology is increasingly being implemented as a way to provide fast and effective communication wherein additional media is available to callers having the appropriate computer equipment and network connections. The embodiments described above are equally effective, and may be practiced, within DNT systems, wherein calls are routed by network nodes. Appropriate IVRs may be provided in such instances at high-traffic nodes to intercept and deal with heavy call loading as described above for more conventional telephone systems.

In terms of routing software associated with ECLM, it may be simply implemented at the network level, and may be limited in functionality to the simple task of rerouting calls based on known capacities within serviced call centers. In another embodiment, T-server software may be implemented both at call centers, and in the network thereby enabling call centers to exert some control over how their incoming calls are routed. Such control, will of course depend upon the level of routing functionality available within each call center subscribing, or otherwise receiving the service. The spirit and scope of the present invention is limited only by the claims that follow.

What is claimed is:

1. An emergency network-level call load-handling system comprising:
   routine intelligence in a network for routing incoming calls to a call center; and
   an interactive voice-response (IVR) selective routing unit connected to the routing intelligence, for processing and prioritizing selected calls;
   wherein selected calls are diverted to the IVR unit for negotiation with a calling party by monitoring call loading for the call center and initiating diversion based on pre-set load thresholds for the call center, and diverted calls are prioritized or otherwise selectively processed by the IVR using specific programmed rules based upon a password known to a caller and provided to the IVR by a calling party and diverted calls determined to have priority based upon the password and programmed rules are routed to their original destination at the call center.

2. The system of claim 1 wherein selective processing comprises playing one or more pre-recorded messages to the calling party.

3. The system of claim 1 wherein the IVR processes calls based on historical statistics regarding system performance.

4. The system of claim 1 wherein the password provided to the IVR is known to the calling party prior to placing the incoming call.

5. The system of claim 1 wherein pre-set load thresholds are stored for one or more subscribing call centers and the IVR is programmed to handle incoming calls for the one or more subscribing call centers.

6. The system of claim 1 wherein the network is a data-network-telephony (DNT)-capable network.

7. The system of claim 6 wherein the DNT-capable network is the Internet.

8. The system of claim 1 wherein the switching apparatus comprises a plurality of telephony switches or routers, and wherein one IVR serves the plurality of switches or routers.

9. An emergency call load-handling system, comprising;

routing intelligence in a network for receiving and routing incoming calls;

an interactive voice-response (IVR) selective routing unit connected to the routing intelligence; and one or more subscribing call centers connected by one or more telephony trunks to the routing intelligence;

wherein selected calls having a destination point at the one or more call centers are diverted to the IVR unit for negotiation with a calling party by monitoring call loading at the subscribing call centers and initiating diversion based on pre-set load thresholds set for each of the one or more call centers, and diverted calls are prioritized by the IVR based on specific programmed rules and a password provided to the IVR by the calling party, and diverted calls determined to have high priority are forwarded to their intended destination points at the call centers, and diverted calls having low priority are not forwarded to their intended destination points at the call centers.

10. The system of claim 9 wherein a pre-recorded message is played to the calling party of calls diverted to the IVR.

11. The system of claim 10 wherein the provided password is known to the calling party prior to placing the incoming call.

12. A method for handling an emergency call loading by network routing intelligence, comprising steps of:

(a) programming routing criteria for individual subscribing call centers in an alternative interactive voice response (IVR) processor, adapted to route calls in an emergency;

(b) screening calls for diversion from their intended destination points at the subscribing call centers by monitoring call loading for each of the subscribing call centers and initiating diversion based on pre-set load thresholds for each of the call centers, and diverting calls to the IVR when the load thresholds are met; and (c) providing a password to the IVR by a calling party;

(d) prioritizing the diverted calls based on the provided password and programmed routing criteria;

(e) forwarding high priority calls to their destination points at the subscribing call centers and calls having low priority are not forwarded to their intended destination points at the subscribing call centers.

13. The method of claim 12 wherein, in step (c) the password is known to the calling party prior to placing the call.

14. The method of claim 12 wherein in step (d), the calls are diverted based on historical statistics regarding system performance.

* * * * *